(12) United States Patent
Morita (10) Patent No.: US 8,176,182 B2
(45) Date of Patent: May 8, 2012

(54) PORTABLE TERMINAL, PROGRAM INSTALLED THEREIN, COMMUNICATION METHOD, AND COMMUNICATION APPARATUS

(75) Inventor: Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1296 days.

(21) Appl. No.: 11/430,312

(22) Filed: May 2, 2006

(65) Prior Publication Data

US 2006/0268801 A1 Nov. 30, 2006

(30) Foreign Application Priority Data

May 30, 2005 (JP) ............................ P2005-157887

(51) Int. Cl.
*G06F 13/00* (2006.01)
(52) U.S. Cl. ...................... 709/227; 709/217
(58) Field of Classification Search .................. 709/227, 709/217–219, 203
See application file for complete search history.

(56) References Cited

U.S. PATENT DOCUMENTS

| 5,881,300 | A | 3/1999 | Chen | |
|---|---|---|---|---|
| 2002/0128051 | A1* | 9/2002 | Liebenow | 455/574 |
| 2003/0050038 | A1* | 3/2003 | Haave et al. | 455/404 |
| 2003/0224810 | A1* | 12/2003 | Enzmann et al. | 455/466 |

FOREIGN PATENT DOCUMENTS

| JP | 09237139 A | 9/1997 |
|---|---|---|
| JP | 2000083109 A | 3/2000 |
| JP | 2002-077151 | 3/2002 |
| JP | 2003-046664 | 2/2003 |
| JP | 2003169015 A | 6/2003 |
| JP | 2003179973 A | 6/2003 |
| JP | 2003256791 A | 9/2003 |
| JP | 2003-333186 | 11/2003 |
| JP | 2005102135 A | 4/2005 |
| WO | 2003-509920 | 3/2001 |
| WO | WO 01/19110 A1 | 3/2003 |

OTHER PUBLICATIONS

Japanese language office action and its English language translation for corresponding Japanese application 2005157887 lists the references above ; mailed Dec. 18, 2009.

* cited by examiner

*Primary Examiner* — Kenneth R Coulter
(74) *Attorney, Agent, or Firm* — DLA Piper LLP (US)

(57) ABSTRACT

A portable terminal includes an access request receiving section for receiving an access request for accessing an IP push server via a communication apparatus which is installed as an external device at the portable terminal, wherein the access request is sent from an SMS server which is requested by the IP push server to send the access request; a commanding section for commanding the communication apparatus to hold power supplied to the communication apparatus after a communication port allocated to the communication apparatus is disconnected, in accordance with the reception of the access request; a communication port disconnecting section for once disconnecting the communication port in accordance with the reception of the access request; and an accessing section for accessing the IP push server by dial-up connection using the communication apparatus.

5 Claims, 5 Drawing Sheets

PORTABLE TERMINAL, PROGRAM INSTALLED THEREIN, COMMUNICATION METHOD, AND COMMUNICATION APPARATUS

BACKGROUND OF THE INVENTION

1. Field of the Invention

The present invention relates to a portable terminal, a program installed in a portable terminal, a communication method, and a communication apparatus.

Priority is claimed on Japanese Patent Application No. 2005-157887, filed May 30, 2005, the content of which is incorporated herein by reference.

2. Description of the Related Art

Figure 5:
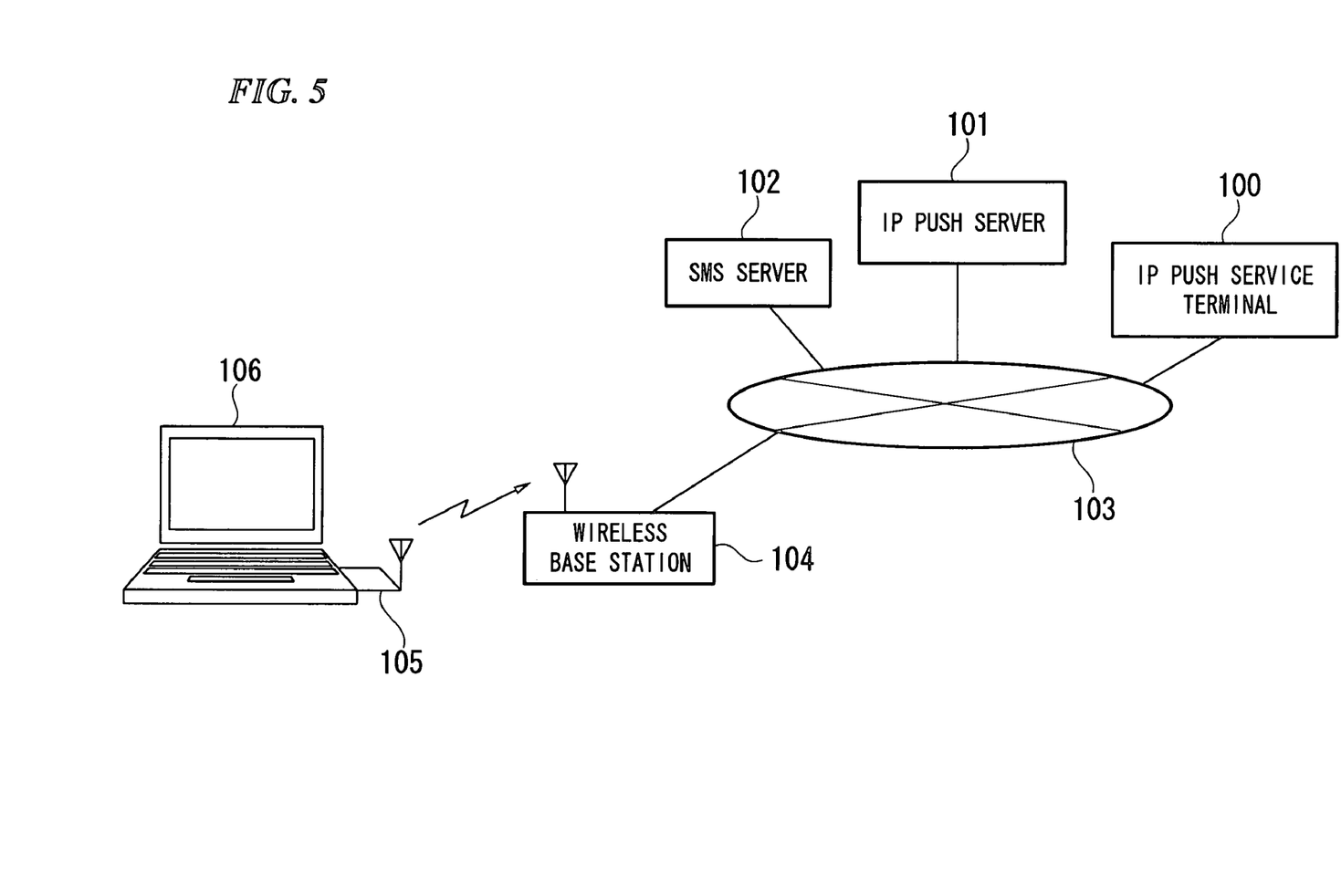
FIG. 5 is a diagram showing the general structure of a conventional IP push service system.

In recent years, a service called "IP push service" has become widely spread, in which data possessed by an upper device on a network is transmitted to a lower device possessed by a user or the like, at a timing different from a timing required by the lower device. FIG. 5 is a diagram showing the general structure of an IP push service system for providing the IP push service to a portable terminal such as a notebook (or personal) computer to which a wireless communication card can be installed.

In FIG. 5, reference numeral 100 indicates an IP push service terminal, reference numeral 101 indicates an IP push server, reference numeral 102 indicates an SMS (short message service) server, reference numeral 103 indicates a communication network, reference numeral 104 indicates a wireless base station, reference numeral 105 indicates a wireless communication card (i.e., a communication apparatus), and reference numeral 106 indicates a portable terminal.

The IP push service terminal 100 is a terminal such as a personal computer, possessed by an ISP (Internet service provider) for providing an IP push service to a user. Specifically, the IP push service terminal 100 commands the IP push server 101 via the communication network 103 to provide an IP push service to a user (i.e., the portable terminal 106).

The IP push server 101 stores various data used for the IP push service. When the IP push server 101 is commanded by the IP push service terminal 100 to provide the IP push service to the user, the IP push server 101 sends the above data to the user.

The SMS server 102 sends an SMS message to the user. The communication network 103 is an analog telephone network spread around various areas of the whole country.

The wireless base station 104, provided in each of specific service areas, is a relay station for connecting a portable communication terminal (i.e., the portable terminal 106 to which the wireless communication card 105 is installed) to the communication network 103 via wireless communication.

The wireless communication card 105 is a PC card for performing wireless communication with the wireless base station 104 by using a CDMA2000 1×EV-DO (code division multiple access 2000 1× evolution data only) method, or the like. The wireless communication card 105 is operated by receiving a power supply from the portable terminal 106.

The portable terminal 106 may be a notebook or personal computer possessed by the user. When the wireless communication card 105 is installed to the portable terminal 106, the portable terminal 106 can access the communication network 103 via the wireless base station 104.

The operation of the IP push service system having the above-described structure will be explained. First, the IP push service terminal 100 commands the IP push server 101 to provide the IP push service to the user. When the IP push server 101 does not know the IP address of the portable terminal 106, the IP push server 101 requests the SMS server 102 to send an SMS message to the portable terminal 106, where the SMS message is a message for requesting access to the IP push server 101 by dial-up connection.

In accordance with the request from the IP push server 101, the SMS server 102 sends the SMS message to the portable terminal 106. The portable terminal 106 is in an SMS reception standby state, and receives the SMS message from the SMS server 102 via the wireless base station 104 and the wireless communication card 105. The portable terminal 106 then analyzes the received SMS message, and starts dial-up connection, so as to access the IP push server 101.

The IP push server 101 can obtain the IP address of the portable terminal 106 by being accessed by the portable terminal 106. Therefore, the IP push server 101 can provide the IP push service designated by the IP push service terminal 100 to the portable terminal 106.

Published Japanese Translation, No. 2003-509920, of PCT International Publication, No. WO01/019110 discloses a technique relating to the IP push service system.

In the above operation, before the analysis of the SMS message is completed and the dial-up connection is started, the portable terminal 106 disconnects a modem port (i.e., a communication port) to which the wireless communication card 105 is installed. Accordingly, the wireless communication card 105 determines that usage of itself (i.e., the card) is terminated, and cuts off power supply voltage supplied by the portable terminal 106, so as to turn off the power of itself. When the portable terminal 106 starts dial-up connection, the wireless communication card 105 determines that usage of itself is started, and turns on the power of itself. In accordance with the turning-on of the power of itself, the wireless communication card 105 starts searching for the wireless base station 104, and dial-up connection is started after completion of the searching operation. As described above, in accordance with the disconnection of the modem port, power of the wireless communication card 105 is once turned off; thus, the operation of searching for the wireless base station 104 is again performed, thereby increasing the time from the reception of the SMS message to the completion of the dial-up connection.

SUMMARY OF THE INVENTION

In light of the above circumstances, an object of the present invention is to eliminate an extra operation of searching for a wireless base station when providing an IP push service to a portable terminal to which a communication apparatus is installed, so as to reduce the time from reception of the SMS message to completion of the dial-up connection.

Therefore, the present invention provides a portable terminal comprising:

an access request receiving section for receiving an access request for accessing an IP push server via a communication apparatus which is installed as an external device at the portable terminal, wherein the access request is sent from an SMS server which is requested by the IP push server to send the access request;

a commanding section for commanding the communication apparatus to hold power supplied to the communication apparatus after a communication port allocated to the communication apparatus is disconnected, in accordance with the reception of the access request;

a communication port disconnecting section for once disconnecting the communication port in accordance with the reception of the access request; and an accessing section for accessing the IP push server by dial-up connection using the communication apparatus.

The present invention also provides a program installed in a portable terminal to which a communication apparatus is installed as an external device, wherein:

the program makes the portable terminal execute the step of:

receiving an access request for accessing an IP push server via a communication apparatus which is installed as an external device at the portable terminal, wherein the access request is sent from an SMS server which is requested by the IP push server to send the access request, the program makes the communication apparatus execute the step of:

holding power supplied to the communication apparatus after a communication port allocated to the communication apparatus is disconnected, in accordance with the reception of the access request, the program also makes the portable terminal execute the steps of:

once disconnecting the communication port in accordance with the reception of the access request; and accessing the IP push server by dial-up connection using the communication apparatus.

The present invention also provides a communication method used in a portable terminal to which a communication apparatus is installed as an external device, wherein the method comprising:

an access request receiving step, executed by the portable terminal, of receiving an access request for accessing an IP push server via a communication apparatus which is installed as an external device at the portable terminal, wherein the access request is sent from an SMS server which is requested by the IP push server to send the access request;

a commanding step, executed by the communication apparatus, of holding power supplied to the communication apparatus after a communication port allocated to the communication apparatus is disconnected, in accordance with the reception of the access request;

a communication port disconnecting step, executed by the portable terminal, of once disconnecting the communication port in accordance with the reception of the access request; and an accessing step, executed by the portable terminal, of accessing the IP push server by dial-up connection using the communication apparatus.

The present invention also provides a communication apparatus comprising:

an access request receiving section for receiving an access request for accessing an IP push server, based on control from a portable terminal to which the communication apparatus is connected, wherein the access request is sent from an SMS server which is requested by the IP push server to send the access request;

an access request output section for outputting the access request to the portable terminal;

a power holding section for holding power supplied to the communication apparatus when receiving a command from the portable terminal after the output of the access request to the portable terminal and before a communication port, which is allocated to the communication apparatus by the portable terminal, is disconnected by the portable terminal, wherein the command indicates holding the power even when the communication port is disconnected.

The present invention also provides a communication apparatus comprising:

an access request receiving section for receiving an access request for accessing an IP push server, based on control from a portable terminal to which the communication apparatus is connected, wherein the access request is sent from an SMS server which is requested by the IP push server to send the access request;

an access request output section for outputting the access request to the portable terminal;

a base station data storing section for storing data of a base station, with which the communication apparatus is presently connected to and communicating with, when the access request is received by the receiving section;

a power disconnecting section for once disconnecting power supplied to the communication apparatus in accordance with disconnection of a communication port, which is allocated to the communication apparatus by the portable terminal, after the access request is output by the access request output section; and a communication connecting section for performing communication connection to the base station which corresponds to the data stored in the base station data storing section, when the communication apparatus is again activated in accordance with start of access of the portable terminal to the IP push server.

In accordance with the present invention, when the portable terminal receives the access request (sent from the SMS server which is requested by the IP push server) for accessing the IP push server via the communication apparatus (installed as an external device), the portable terminal once disconnects the communication port allocated to the communication apparatus and accesses the IP push server by dial-up connection using the communication apparatus. In this process, the portable terminal commands the communication apparatus to hold power supplied to the communication apparatus after the communication port is disconnected.

Therefore, turning-off of the power of the communication apparatus in accordance with the disconnection of the communication port is prevented; thus, when dial-up connection is performed, an unnecessary operation of searching for the base station is not performed. Accordingly, it is possible to reduce the time from the reception of the SMS message to the completion of the dial-up connection.

DETAILED DESCRIPTION OF THE INVENTION

Hereinafter, embodiments according to the present invention will be described with reference to the appended figures. In the embodiments, the structure of the IP push service system is similar to that shown in FIG. 5; thus, the structures and the operations of a wireless communication card 105 and a portable terminal 106 of the embodiments will be explained below.

First Embodiment

Figure 1:
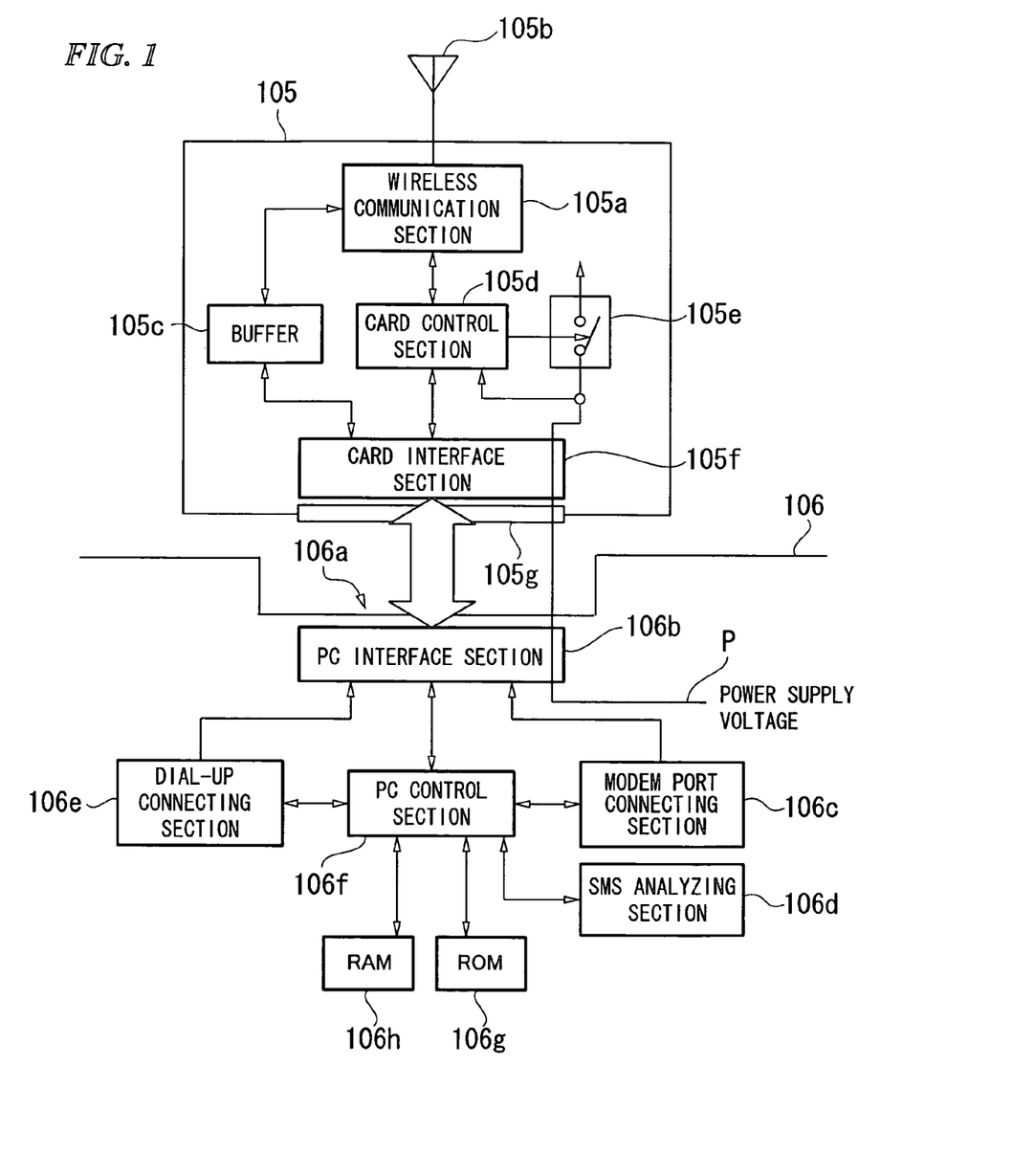
FIG. 1 is a block diagram showing the structures of the wireless communication card 105 and the portable terminal 106 in a first embodiment in accordance with the present invention.

FIG. 1 is a block diagram showing the structures of the wireless communication card 105 and the portable terminal 106 in a first embodiment in accordance with the present invention.

As described above, the portable terminal 106 is a portable terminal such as a notebook or a personal computer possessed by the user, and has a PC card slot 106a. When the wireless communication card 105 is inserted into the PC card slot 106a, a communication connection can be established between the portable terminal 106 and a communication network 103 via a wireless base station 104.

The wireless communication card 105 has a wireless communication section 105a, an antenna 105b, a buffer 105c, a card control section 105d, a power switch 105e, a card interface section 105f, and a connector 105g.

The wireless communication section 105a performs wireless communication with the wireless base station 104 by using, for example, the CDMA2000 1×EV-DO method, and performs frequency conversion or modulation/demodulation of a data signal, which is transmitted or received via the antenna 105b.

The buffer 105c is provided for temporarily storing a transmitted data signal before modulation, or a received data signal after demodulation.

The card control section 105d controls the entire operation of the wireless communication card 105 based on a control signal input from the portable terminal 106 via the card interface section 105f. In addition, based on a card power control signal transmitted from the portable terminal 106, the card control section 105d controls ON/OFF of the power switch 105e so as to maintain (or hold) or disconnect the power of the wireless communication card 105.

To the power switch 105e, a power supply voltage is supplied from the portable terminal 106 via a power supply line P. The power switch 105e supplies the power supply voltage to each section of the wireless communication card 105, and performs power supply (or holding) or disconnection under control performed by the card control section 105d, as described above. The power supply line P is connected to the card control section 105d and the power switch 105e, and the power supply voltage is always supplied to the card control section 105d.

The card interface section 105f is an interface for performing transmission and reception of a data signal and a control signal to and from the portable terminal 106 via the connector 105g. The connector 105g is of a "32 bit CardBus" type. When this connector is connected to the PC card slot 106a of the portable terminal 106, the wireless communication card 105 and the portable terminal 106 are mechanically and electrically connected to each other.

The portable terminal 106 has a PC card slot 106a, a PC interface section 106b, a modem port connecting section 106c, an SMS analyzing section 106d, a dial-up connecting section 106e, a PC control section 106f, a ROM (read only memory) 106g, and a RAM (random access memory) 106h.

As described above, the PC card slot 106a is provided for mechanically and electrically connecting the wireless communication card 105 and the portable terminal 106, and the PC interface section 106b is an interface for performing transmission and reception of a data signal and a control signal to and from the wireless communication card 105, more specifically, the card interface section 105f.

The modem port connecting section 106c performs connection and disconnection of a modem port (i.e., a communication port) under control performed by the PC control section 106f.

The SMS analyzing section 106d analyzes an SMS message sent from the SMS server 102 via the wireless base station 104, and outputs a result of the analysis to the PC control section 106f.

The dial-up connecting section 106e performs dial-up connection and disconnection under control performed by the PC control section 106f.

The PC control section 106f controls operation of each section in the portable terminal 106, by using a device driver for the wireless communication card 105, where the device driver is installed in the ROM 106g in advance. Accordingly, the PC control section 106f performs transmission and reception of a data signal to and from the wireless communication card 105 and outputs control signals via the PC interface section 106b. In addition, while the SMS message is analyzed, the PC control section 106f outputs a card power control signal via the PC interface section 106b to the card control section 105d so as to request the card control section 105d to maintain (or hold) the power (detailed explanations will be provided later).

The ROM 106g stores the device driver, a system program, and various application programs, which are executed by the PC control section 106f, and other nonvolatile data, or the like. The RAM 106h is memory used as a working area of the PC control section 106f.

Next, the operation of the portable terminal 106, to which the wireless communication card 105 having the above-described structure is installed, will be explained with reference to a flowchart shown in FIG. 2.

First, when the wireless communication card 105 is connected to the PC card slot 106a of the portable terminal 106, power supply voltage is supplied from the portable terminal 106 via the power supply line P to the card control section 105d and the power switch 105e. Accordingly, the card control section 105d is activated, and the power switch 105e is turned ON, thereby supplying the power supply voltage to each section of the wireless communication card 105 and performing specific initial setting. In this process, the card control section 105d searches for the wireless base station 104 via the wireless communication section 105a, and establishes communication connection with the wireless base station 104, so that the card control section 105d is set to a reception standby state (see step S1).

In the next step S2, the PC control section 106f commands the modem port connecting section 106c to perform connection of the modem port, and accordingly, the modem port connecting section 106c performs connection of the modem port. The PC control section 106f then shifts to an SMS reception standby state (see step S3).

As described above, when an IP push server 101 does not know the IP address of the portable terminal 106, the IP push server 101 requests an SMS server 102 to send an SMS message to the portable terminal 106, where the SMS message is a message for requesting access to the IP push server 101 by dial-up connection.

In accordance with the request from the IP push server 101, the SMS server 102 sends the SMS message to the wireless communication card 105 via the wireless base station 104. The received SMS message is transmitted to the PC control section 106f via the wireless communication section 105a, the buffer 105c, the card interface section 105f, and the PC interface section 106b (see step S4). In step S4, the PC control section 106f maintains the SMS reception standby state until the SMS message is received.

When the SMS message is input as described above, the PC control section 106f outputs the SMS message to the SMS analyzing section 106d. The SMS analyzing section 106d analyzes the content of the SMS message, and outputs a result of the analysis to the PC control section 106f (see step S5). The PC control section 106f then outputs a card power holding (or maintenance) request to the card control section 105d (see step S6), and simultaneously, commands the modem port connecting section 106c to disconnect the modem port (see step S7).

In the conventional operation, when the modem port is disconnected in step S7, the card control section 105d determines that usage of itself is terminated, and turns off the power switch 105e. However, in the portable terminal 106 of the present embodiment, the card power holding request is output to the card control section 105d before the disconnection of the modem port, thereby maintaining the ON state of the power switch 105e, that is, the power ON state of the wireless communication card 105.

After the modem port is disconnected, the PC control section 106f commands the dial-up connecting section 106e to start dial-up connection (see step S8). In this process, the power ON state of the wireless communication card 105 has been maintained even after the disconnection of the modem port; thus, it is unnecessary to search for the wireless base station 104 again (which is necessary in the conventional operation). Therefore, dial-up connection can be immediately started. In addition, when the dial-up connection is started, the card control section 105d determines that usage of itself is started, and turns on the power switch 105e, as performed in the conventional operation. After the power switch 105e is turned on, the card power holding request is unnecessary. Therefore, the PC control section 106f terminates the card power holding request in accordance with the start of the dial-up connection (see step S9).

When the dial-up connection is completed, the PC control section 106f accesses the IP push server 101 based on the result of the analysis of the SMS message (see step S10), and simultaneously, activates an application program corresponding to the IP push service (see step S11). In accordance with the execution of the application program, the PC control section 106f performs data transmission and reception for receiving data for the IP push service from the IP push server 101 via the wireless communication card 105 (see step S12). When the data transmission and reception are completed, the PC control section 106f commands the dial-up connecting section 106e to disconnect the dial-up connection (see step S13). The operation from step S2 to step S13 is repeatedly performed until the IP push service is terminated (see step S14).

As explained above, in accordance with the first embodiment, the PC control section 106f issues the card power holding request to the card control section 105d before disconnection of the modem port, so as to maintain the ON state of the power switch 105e, that is, the power ON state of the wireless communication card 105. Therefore, when dial-up connection is performed after disconnection of the modem port, it is unnecessary to search for the wireless base station 104 again, thereby reducing the time from reception of the SMS message to completion of the dial-up connection.

Second Embodiment

Figure 3:
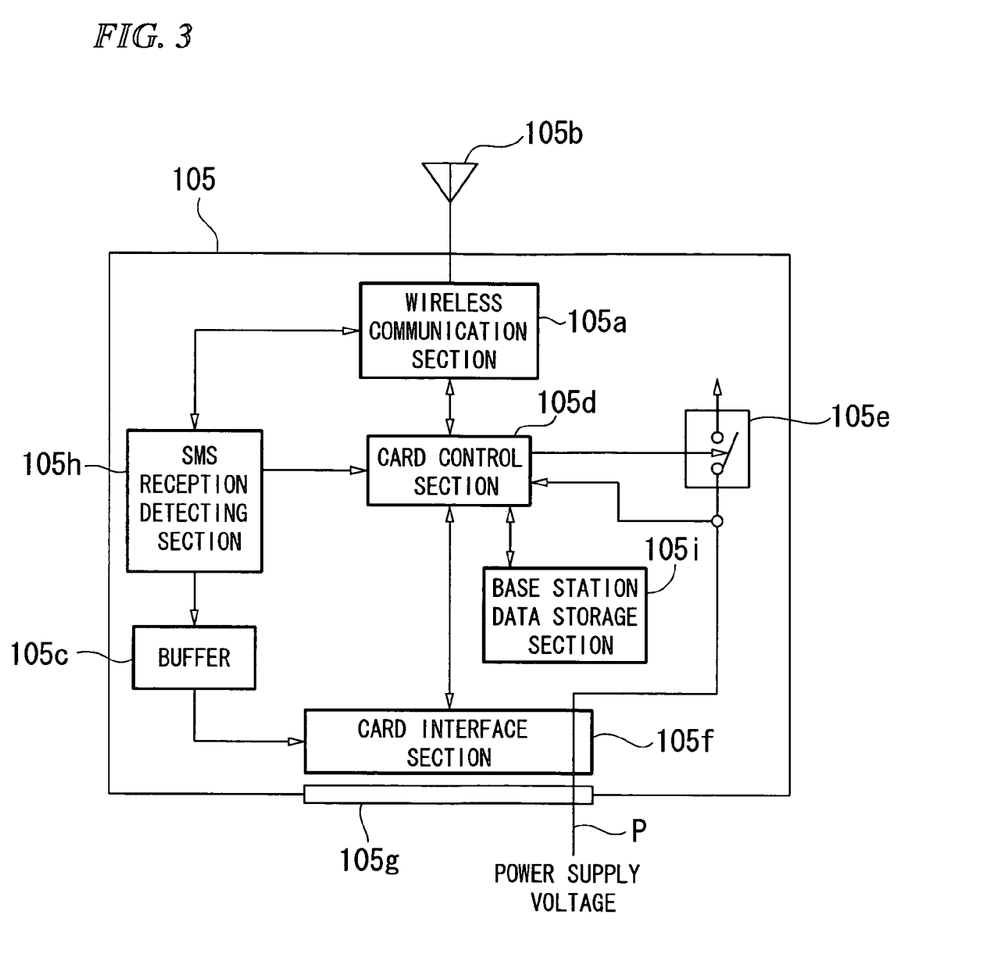
FIG. 3 is a block diagram showing the structure of the wireless communication card 105 in a second embodiment in accordance with the present invention.

A second embodiment in accordance with the present invention will be explained below. FIG. 3 is a block diagram showing the structure of the wireless communication card 105 of the present embodiment. In FIG. 3, parts identical to those in FIG. 1 are given identical reference numerals, and explanations thereof are omitted.

In FIG. 3, reference numeral 105h indicates an SMS reception detecting section, and reference numeral 105i indicates a base station data storage section.

The SMS reception detecting section 105h monitors whether the SMS message has been received, based on the received data demodulated by the wireless communication section 105a. When reception of the SMS message is detected, the SMS reception detecting section 105h outputs an SMS message detection signal to the card control section 105d. When receiving the SMS message detection signal from the SMS reception detecting section 105h, the card control section 105d stores (i) base station data (such as an ID number) of the wireless base station 104 with which the wireless communication card 105 is presently connected to and communicating with, and (ii) the present time (i.e., SMS reception time) in the base station data storage section 105i. The relevant operation of the card control section 105d will be explained in detail later.

The base station data storage section 105i is memory such as a flash memory, in which stored data is not deleted even when the power is disconnected.

The structure of the portable terminal 106 of the second embodiment is similar to that shown in FIG. 1; however, in contrast to the first embodiment, the PC control section 106f of the present embodiment does not output a card power holding request to the card control section 105d before disconnection of the modem port.

Below, the operation of the portable terminal 106, to which the wireless communication card having the above-described structure is installed, will be explained with reference to a flowchart shown in FIG. 4.

Figure 2:
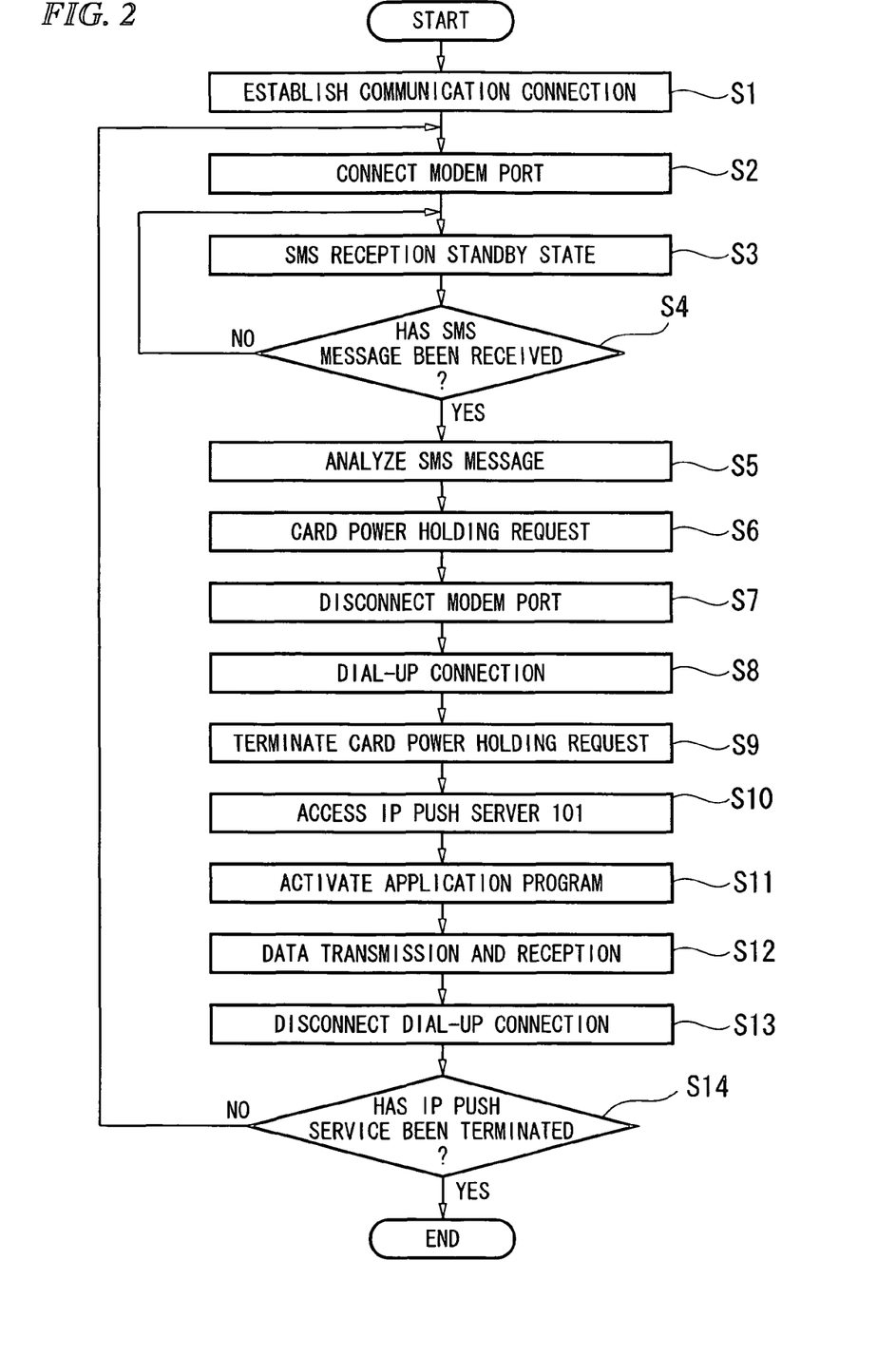
FIG. 2 is a flowchart showing the operations of the wireless communication card 105 and the portable terminal 106 in the first embodiment.
Figure 4:
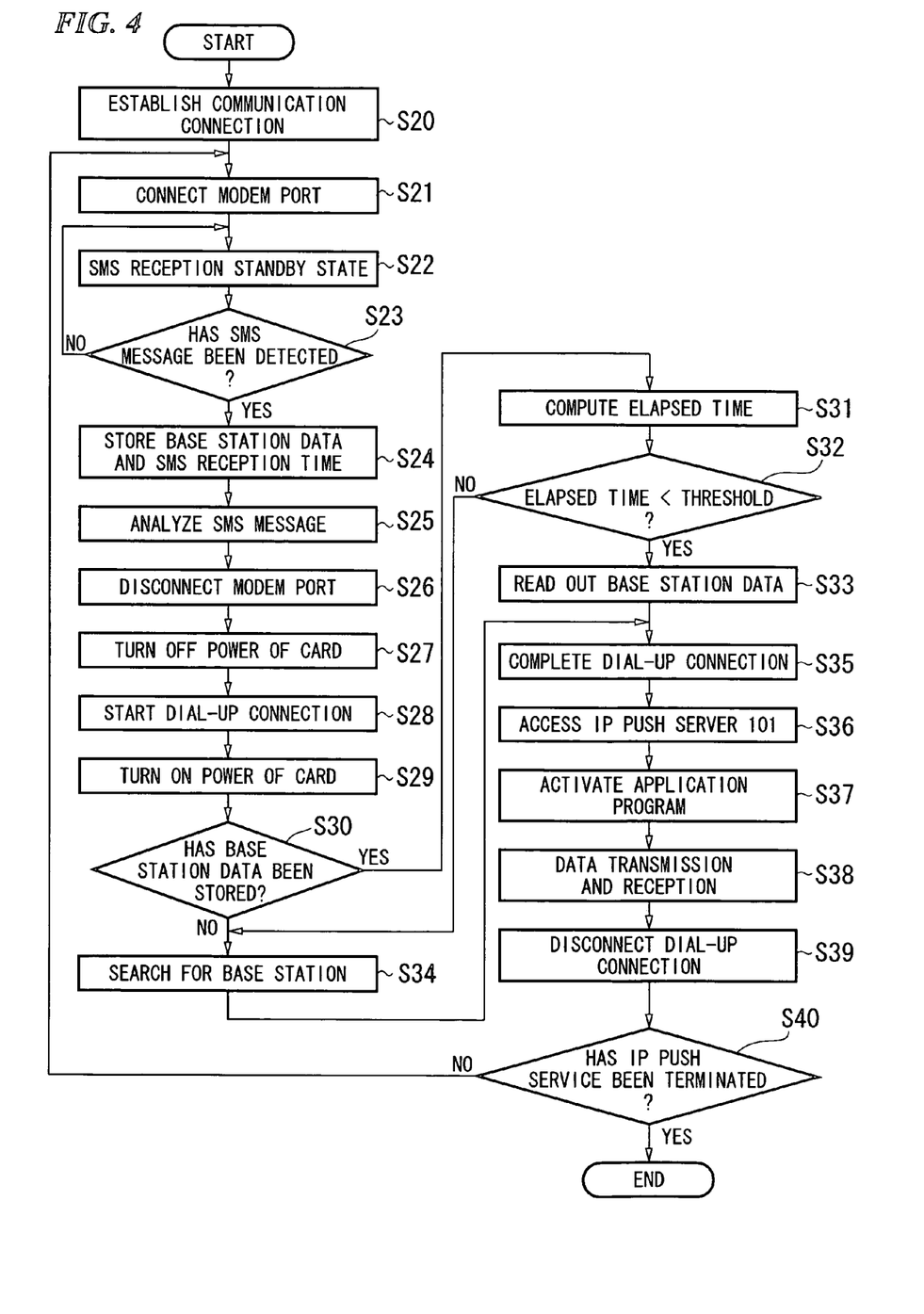
FIG. 4 is a flowchart showing the operations of the wireless communication card 105 and the portable terminal 106 in the second embodiment.

In FIG. 4, steps S20 to S22 are identical to steps S1 to S3 in FIG. 2; thus, explanations thereof are omitted.

The SMS reception detecting section 105h monitors whether the SMS message has been received, based on the received data demodulated by the wireless communication section 105a (see step S23). When reception of the SMS message is detected, the SMS reception detecting section 105h outputs the SMS message detection signal to the card control section 105d. In synchronism with the SMS message detection signal, the card control section 105d stores (i) the base station data (such as the ID number) of the wireless base station 104 with which the wireless communication card 105 is presently connected to and communicating with, and (ii) the present time (i.e., SMS reception time) in the base station data storage section 105i (see step S24).

The SMS message received by the wireless communication section 105a is transmitted via the card interface section 105f and the PC interface section 106b to the PC control section 106f, and the PC control section 106f outputs the SMS message to the SMS analyzing section 106d. The SMS analyzing section 106d analyzes the content of the SMS message, and outputs a result of the analysis to the PC control section 106f (see step S25). The PC control section 106f then commands the modem port connecting section 106c to disconnect the modem port (see step S26). In this process, the card control section 105d determines that usage of itself is terminated, and turns off the power switch 105e (see step S27). That is, similarly to in the conventional operation, power of the wireless communication card 105 is once turned off.

After the disconnection of the modem port, the PC control section 106f commands the dial-up connecting section 106e to start dial-up connection (see step S28). When the dial-up connection is started, the card control section 105d determines that usage of itself is started, and turns on the power switch 105e (see step S29).

In the next step S30, the card control section 105d determines whether the base station data is stored in the base station data storage section 105i. When the base station data is stored, the card control section 105d computes an elapsed time (=present time−SMS reception time) (see step S31). In the next step S32, the card control section 105d compares the above elapsed time with a predetermined threshold. When the elapsed time is less than the threshold, the card control section 105d determines that the portable terminal 106 is still present in a service area of the same base station 104 after the portable terminal 106 has received the SMS message, and reads out the base station data stored in the base station data storage section 105i, and performs communication connection to the wireless base station 104 corresponding to the base station data (see step S33).

When the elapsed time is equal to or larger than the threshold in step S32, the card control section 105d determines that the possibility of the portable terminal 106 still being present in the service area of the same base station 104 after the portable terminal 106 has received the SMS message, is low, and newly searches for the base station 104 (see step S34). Therefore, the above threshold is a parameter for determining whether the portable terminal 106 is still present in the service area of the same base station 104 after the portable terminal 106 has received the SMS message, and the threshold is set in consideration of a time period necessary for the user (who possesses the portable terminal 106) to move to another place, or the like.

When the wireless base station 104 with which the wireless communication card 105 can be connected to and communicate with at present is determined in step S33 or step S34, and dial-up connection is completed (see step S35), the PC control section 106f accesses the IP push server 101 based on the result of the analysis of the SMS message (see step S36). The following steps S37 to S40 are identical to steps S11 to S14 in FIG. 2.

As explained above, in accordance with the second embodiment, the base station data obtained when the SMS message is received is stored in the base station data storage section 105i. Therefore, even when the power of the wireless communication card 105 is turned off after disconnection of the modem port, as performed in the conventional operation, the operation of searching for the base station 104 is unnecessary when dial-up connection is performed. Therefore, it is possible to reduce the time from the reception of the SMS message to the completion of the dial-up connection.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A portable terminal comprising:
an access request receiving section for receiving an access request for accessing an IP push server via a communication apparatus that is an external device connected to the portable terminal, wherein the access request is sent from an SMS server which is requested by the IP push server to send the access request;
a commanding section for commanding, when the access request is received by the access request receiving section, the communication apparatus that is the external device to hold power supplied from the portable terminal to the communication apparatus;
a communication port disconnecting section for once disconnecting, after the commanding of the commanding section, a communication port allocated to the communication apparatus; and
an accessing section for accessing, after the disconnection of the communication port, the IP push server by dial-up connection using the communication port allocated to the communication apparatus while the power supplied from the portable terminal to the communication apparatus is held.

2. A computer-readable storage medium which stores a program installed in a portable terminal to which a communication apparatus that is an external device is connected, wherein the program makes the portable terminal execute the a steps of:
receiving an access request for accessing an IP push server via a communication apparatus that is the external device connected to the portable terminal, wherein the access request is sent from an SMS server which is requested by the IP push server to send the access request;
commanding, when the access request is received in the receiving step, the communication apparatus to hold power supplied from the portable terminal to the communication apparatus;
once disconnecting, after the commanding in the commanding step, a communication port allocated to the communication apparatus; and
accessing, after the disconnection of the communication port, the IP push server by dial-up connection using the communication port allocated to the communication apparatus while the power supplied from the portable terminal to the communication apparatus is held.

3. A communication method used in a portable terminal to which a communication apparatus that is an external device is connected, wherein the method comprising:
an access request receiving step of receiving an access request for accessing an IP push server via a communication apparatus that is the external device connected to the portable terminal wherein the access request is sent from an SMS server which is requested by the IP push server to send the access request;
a commanding step of commanding, when the access request is received in the access request receiving step, the communication apparatus to hold power supplied from the portable terminal to the communication apparatus;
a communication port disconnecting step of once disconnecting, after the commanding in the commanding step, a communication port allocated to the communication apparatus; and
an accessing step of accessing, after the disconnection of the communication port, the IP push server by dial-up connection using the communication port allocated to the communication apparatus while the power supplied from the portable terminal to the communication apparatus is held.

4. A communication apparatus that is an external device connected to a portable terminal, the communication apparatus comprising:
an access request receiving section for receiving an access request for accessing an IP push server, based on control from the portable terminal to which the communication apparatus that is the external device is connected, wherein the access request is sent from an SMS server which is requested by the IP push server to send the access request;

an access request output section for outputting the access request to the portable terminal using a communication port, which is allocated to the communication apparatus by the portable terminal; and a power holding section for holding power supplied from the portable terminal to the communication apparatus when receiving a command from the portable terminal after the access request is output to the portable terminal using the communication port, wherein the command indicates holding the power even when the communication port is disconnected.

5. A communication apparatus that is an external device connected to a portable terminal, the communication apparatus comprising:

an access request receiving section for receiving an access request for accessing an IP push server, based on control from the portable terminal to which the communication apparatus that is the external device is connected, wherein the access request is sent from an SMS server which is requested by the IP push server to send the access request;

an access request output section for outputting the access request to the portable terminal using a communication port, which is allocated to the communication apparatus by the portable terminal;

a base station data storing section for storing data of a base station, with which the communication apparatus is presently connected to and communicating with, when the access request is received by the receiving section;

a power disconnecting section for once disconnecting power supplied from the portable terminal to the communication apparatus when the communication port is disconnected after the data storage of the base station data storing section; and a communication connecting section for performing communication connection to the base station which corresponds to the data stored in the base station data storing section, when the communication apparatus is again activated in accordance with start of access of the portable terminal to the IP push server.

* * * * *